A. G. REMHILT.
SIGNAL.
APPLICATION FILED OCT. 25, 1913.
1,126,272.
Patented Jan. 26, 1915.
2 SHEETS—SHEET 1.
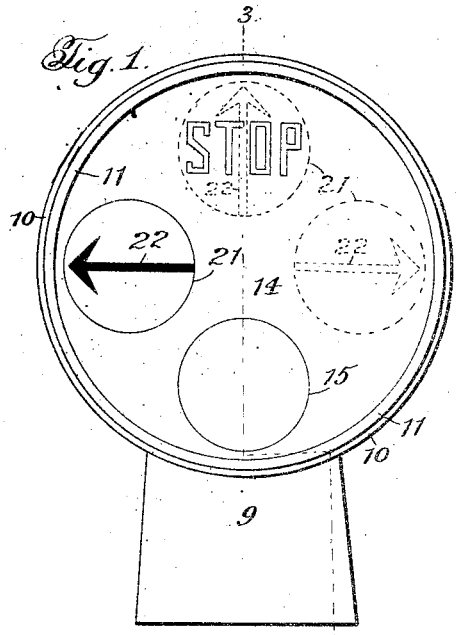
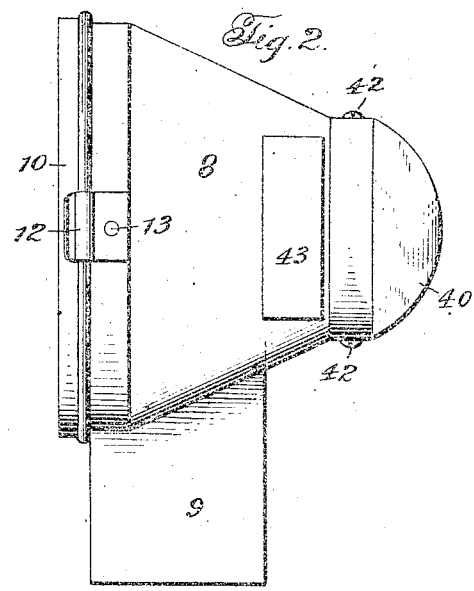
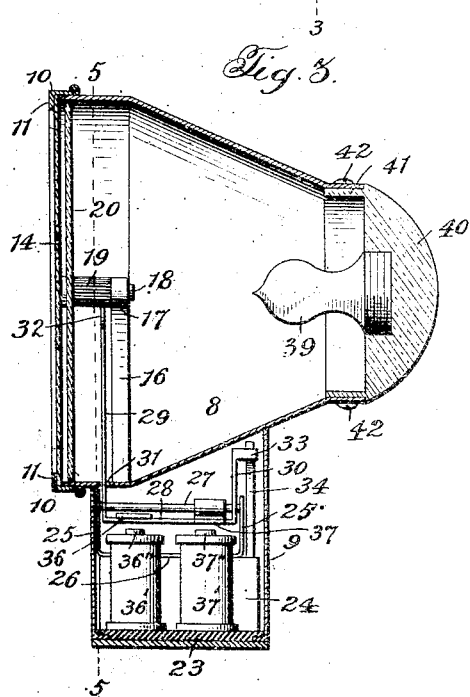
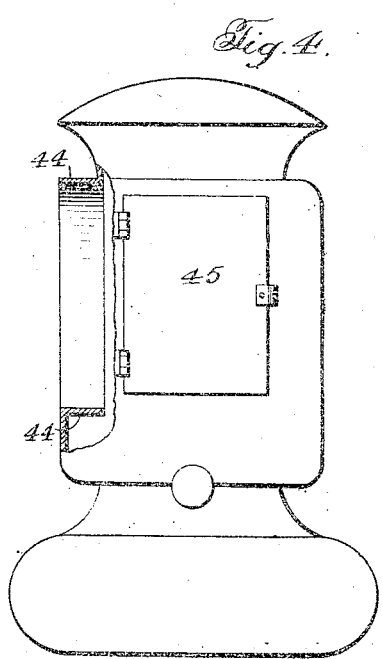
Witnesses:
Jas. E. Hutchinson
G. A. Marvin
Inventor
Arthur G. Remhilt,
By H. Ralph Burton, Attorneys

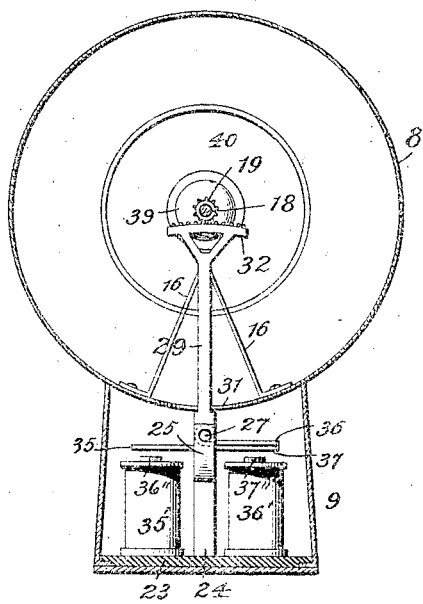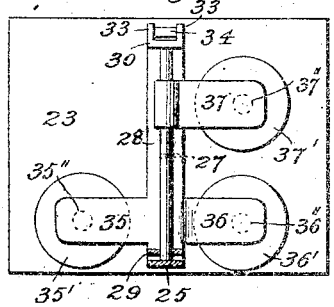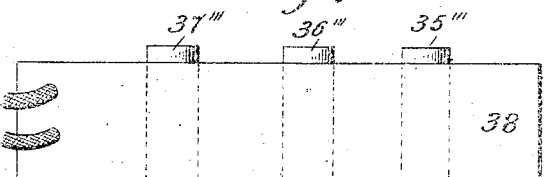

UNITED STATES PATENT OFFICE.

ARTHUR G. REMHILT, OF PHILADELPHIA, PENNSYLVANIA.

SIGNAL.

1,126,272.    Specification of Letters Patent.    Patented Jan. 26, 1915.

Application filed October 25, 1913. Serial No. 797,249.

*To all whom it may concern:*

Be it known that I, ARTHUR G. REMHILT, a citizen of the United States, residing at Philadelphia, in the county of Philadelphia and State of Pennsylvania, have invented certain new and useful Improvements in Signals, of which the following is a specification, reference being had therein to the accompanying drawings.
This device is for use particularly on the rear of a vehicle to indicate to those behind the intention of the operator to turn to the right or left, to stop, or to continue on his way, and at the same time to afford illumination for the license-tag on the vehicle.

The invention provides a signal device of this kind including an electrically-operated mechanism that is controlled by a switch at the front of the vehicle in a position convenient to the operator.

Further, the device is so arranged that an electric, oil, or other illuminant may be attached thereto, without in any way disturbing, or necessitating alteration of the signal-operating mechanism.

When read in connection with the description herein, the details of construction and arrangement of parts will be apparent from the accompanying drawings, forming part hereof, wherein an embodiment of the device suitable for use on a motor-vehicle is disclosed, for purposes of illustration.

While the embodiment of the device shown now is considered a preferable one, it is to be understood that it is not the intention to be limited necessarily thereto in interpretation of the claims, as alterations and modifications therein can be made within the scope of the claims without departing from the nature and spirit of the invention.

Like reference-characters refer to corresponding parts in the views of the drawings, of which—

Figure 1 is a rear elevation; Fig. 2 is a side elevation; Fig. 3 is a sectional view, on the line 3—3, Fig. 1; Fig. 4 is a sectional view of a flame-lamp adapted to be substituted for the electric-lamp shown in Fig. 3; Fig. 5 is a sectional view on the line 5—5, Fig. 3; Fig. 6 is a top view of the operating mechanism; and Fig. 7 is a view of the switch.

Having more particular reference to the drawings, 8 designates a funnel-shaped case, to the lower part of which is secured a casing 9. A ring or band 10, having an annular flange 11, fits over the rear edge of the case 8, and it is held thereon by snap-clasps 12 secured to the case by screws, rivets, or other suitable fasteners 13.

A colorless, transparent plate 14, preferably glass, is held by the band between its flange 11 and the edge of the case. The colorless plate 14, below its center or near its bottom, has a comparatively small translucent colored portion 15, preferably circular and red, which may be produced in any suitable manner, as by setting a colored piece of material into the plate or securing it to the inside surface thereof. The colorless plate 14 has shown thereon, preferably inside and black, the word "Stop" or other intention-indicator, above the center or near the top and the same distance from the center as the colored portion 15. The intention-indicator referred to should not cover an area exceeding that of the colored portion of the colorless plate.

A standard or support 16 is secured to and rises from the bottom of the case 8 near the colorless plate, and it extends to a place opposite the center of the plate, where it has a boxing 17. An arbor 18 is journaled in this boxing, and it has fast thereon a pinion 19 and a colored translucent plate 20, preferably red glass, which is of substantially the same diameter as the colorless plate 14, and which is positioned close to that plate. The colored plate has a colorless transparent portion 21, of an area the same as, or not exceeding, that of the colored portion of the plate 14 and the same distance from the center, so that, when the colored plate is turned, its colorless portion at different times can be brought to registry with said colored portion at the bottom and the word "Stop" or other intention-indicator at the top of the colorless plate. Diametrically across the colorless transparent portion 21 is an arrow or other direction-indicating mark 22 pointing to the periphery of the device.

By an actuating mechanism associated with the pinion 19, hereinafter described, the colored plate is turned and stopped at the proper places to point the mark 22 to the right or the left to indicate that the operator of the vehicle bearing the signal intends to turn to the right or the left, to bring the colorless portion of the colored plate over the word "Stop" or other intention-indicator at the top to show intention of the operator, and to bring the colorless portion into registry with the colored portion 15 of the plate 14 in order to show colored light only when the vehicle is proceeding in a direct course to indicate that there is no change of intention on the part of the operator as to direction or continuance of movement.

Within, and on the bottom of, the casing 9, there is a base 23 of non-conductive material, and thereon is a non-conductive upright or support 24. Rising from the support near each of its ends are standards 25, which may be formed as the limbs of a substantially U-shaped metal piece 26 secured to the top of the upright.

A rock-shaft 27 is journaled in the standards 25 near their upper ends. A member, of substantially U shape, is mounted on the rock-shaft, with a web portion 28 below and approximately parallel to the shaft and with its limbs or arms 29 and 30 journaled on the shaft near its ends. One limb, 29, extends upwardly through a slot 31 into the case 8, and it has on its upper end a rack 32 in mesh with the pinion 19 on the arbor 18. The other limb, 30, extends upwardly entirely within the casing 9, and it has on its upper end laterally-extending lugs 33, between which is disposed a leaf-spring 34 fast on the support 24. The arrangement is such that the leaf-spring in contact with the lugs will keep the limb 29 normally in position to maintain the colorless portion of the colored plate 20 in registry with the colored portion of the colorless plate 14, so that colored light only normally will be shown to the rear by the signal.

In order to cause the limb 29 to swing from its normal position to one side or the other to rotate the colored plate and bring its colorless portion 21 and mark 22 to either one of the signaling positions, the web 28 of the U-shaped member has thereon oppositely-extending fixed armatures 35 and 36, and loose on the shaft 27 there is an armature 37, which rests on the web portion and is free to permit said portion at times to move independently thereof. Mounted on the base 23 under the armatures are electro-magnets 35', 36', and 37', having cores 35'', 36'', and 37'' arranged to draw the armatures down to them and to rock the limb 29. The distances between the upper end of the core 35'' and the armature 35 and between the upper end of the core 37'' and the armature 37 on the other side when it is resting on the web portion 28 of the same, and such that, when, on energizing either magnet 35' or 37', the armature above it meets its core, the limb 29 will have swung sufficiently to the left or right, as the case may be, to have turned the mark 22 to position pointing to the left or right. Thus it will be seen that the cores act as stops to discontinue movement of the parts at the proper times. The distance between the upper end of core 36'' and armature 36, which is on the same side as armature 37, is greater than in the case of the other armatures, and such that, by the time that armature has met the end of the core, the colorless portion 21 will have been turned to the top and over the word "Stop" or other intention-indicator at the top, so that that indicator is displayed. The armature 37 is loose on the shaft 27, in order that it may not stop the motion of the parts by contact with the core beneath it on movement under the influence of magnet 36', but may permit continuance of movement independently thereof until stopped by the armature 36 meeting the core 36''. Every magnet will hold the signal in the position to which moved until the current is cut off. When the current is cut off, the spring 34 will move the parts to normal position with the colorless portion of the colored plate in registry with the colored portion of the colorless plate, when only colored light will be shown.

The magnets are energized by an electric current from any suitable source controlled by any suitable means convenient to the operator of the vehicle with which the signal is associated, as, for example, by a switch such as shown in Fig. 7. This switch includes a non-conductive hollow casing 38, having plungers 35''', 36''', and 37''' extending therethrough, which are arranged to switch current on and off from magnets 35', 36', and 37', respectively.

The signal is illuminated by any suitable means, as by an electric lamp 39, carried by a socket member 40, having a flange 41 fitted into the front of the case 8 and held therein by removable fastenings 42, as shown in Fig. 3. The case may have a transparent plate 43, preferably glass, in its side, as shown in Fig. 2, to show light laterally on a license-tag. If it is desired to illuminate the signal by a flame-lamp, the socket 40 and its lamp may be withdrawn and there may be used a lamp of the type shown by Fig. 4. This lamp has an opening surrounded by a flange 44 arranged to fit over and to be held on the front end of case 8. Such a lamp should be provided with a transparent plate 45, preferably glass, to show light laterally on a license-tag.

Having thus described my invention, what I claim as new, and desire to secure by Letters Patent, is—

1. A signal device comprising a rotatable member having an indicator associated therewith, a pinion arranged to rotate said member, a pivotally-mounted member having a web portion, an arm on said web portion having a rack in mesh with said pinion, another arm on said web portion having associated therewith a spring arranged to hold said rotatable member normally in one indicating position, an armature on said web portion, and an electro-magnet arranged to move said web portion through the instrumentality of said armature and to cause said rotatable member to move to another indicating position.

2. A signal device comprising a rotatable member having an indicator associated therewith, an actuating member arranged to rock said rotatable member and thereby to turn said indicator to indicating positions, a plurality of armatures connected with said actuating member and one of said armatures being pivoted thereon and capable of relative movement in one direction only independently of said actuating member, and an electro-magnet arranged to move each of said armatures.

3. A signal device comprising a rotatable member having an indicator associated therewith, an actuating member arranged to rock said rotatable member and thereby to turn said indicator to indicating positions, an armature fixed to said actuating member, another armature pivotally mounted on said actuating member and normally contacting with a part thereof whereby its relative movement in one direction with respect to said actuating member is prevented, and an electro-magnet arranged to move each of said armatures.

In testimony whereof, I affix my signature in the presence of two witnesses.

ARTHUR G. REMHILT.

Witnesses:
RUDOLPH E. SCHUENMANN,
HARVEY R. TRAUGER.